United States Patent [19]

King et al.

[11] Patent Number: 5,417,245
[45] Date of Patent: May 23, 1995

[54] METERING VALVE AND NEW USE THEREOF

[75] Inventors: Gerald V. King, Odem; William V. Sargent, Corpus Christi, both of Tex.

[73] Assignee: Hoechst Celanese Corporation, Somerville, N.J.

[21] Appl. No.: 32,888

[22] Filed: Mar. 18, 1993

[51] Int. Cl.$^6$ .............................................. F16K 1/02
[52] U.S. Cl. ................................. 137/862; 251/205; 251/367
[58] Field of Search ............. 251/205, 367; 137/862; 203/98

[56] References Cited

U.S. PATENT DOCUMENTS

| Re. 32,197 | 7/1986 | Self | 137/549 |
|---|---|---|---|
| 582,507 | 5/1897 | Marchaut et al. | 137/561 R |
| 2,516,825 | 7/1950 | Hejduk et al. | 251/34 |
| 2,743,909 | 5/1956 | Lawlor | 259/42 |
| 2,881,783 | 4/1959 | Andrews | 137/244 |
| 3,907,683 | 9/1975 | Gilmont | 202/197 |
| 3,910,553 | 10/1975 | Boylan | 251/205 |
| 3,997,141 | 12/1976 | Baumann | 251/205 |
| 4,099,703 | 7/1978 | Lush | 251/205 |
| 4,193,422 | 3/1980 | Rider | 137/862 |
| 4,281,935 | 8/1981 | Cramer et al. | 366/174 |
| 4,283,041 | 8/1981 | Kujawski | 251/205 |
| 4,438,782 | 3/1984 | Kelly | 137/862 |
| 4,512,372 | 4/1985 | Lew et al. | 137/862 |
| 4,552,336 | 11/1985 | Pastrone | 251/205 |
| 4,687,180 | 8/1987 | Simonelli et al. | 251/205 |
| 4,966,198 | 10/1990 | Harstone | 137/862 |
| 5,020,774 | 6/1991 | Christianson | 251/205 |

OTHER PUBLICATIONS

Renken, "Dual-Control Metering Value" IBM, Technical Disclosure Bulletin vol. 17, No. 11, Apr, 1975.

Primary Examiner—Virginia Manoharan
Attorney, Agent, or Firm—James J. Mullen; Donald R. Cassady

[57] ABSTRACT

A novel metering valve is used to split the streams in which a continuous fluid stream passes unregulated through the valve along a primary flow path. A second stream is formed by passing a small portion of the fluid in the primary flow path through a passage in a valve seat. The fluid passing through the valve seat is precisely metered by a valve stem which engages the valve seat passage to control the amount of fluid diverted from the primary flow path. Both fluid from the unregulated primary flow path and through the metered flow path flow simultaneously from the valve. The metering valve of the invention has particular use in processes for dividing a condensed distillate stream into a product stream and a reflux stream.

7 Claims, 1 Drawing Sheet

METERING VALVE AND NEW USE THEREOF

BACKGROUND OF THE INVENTION

The present invention is directed to a method of splitting a continuous fluid stream into two streams of substantially different volumes. In particular, the present invention is directed to a novel metering valve and the use thereof to split a continuous fluid stream into two fluid streams which simultaneously flow from the valve. The invention has particular use in splitting the flow of a continuous condensed distillate stream into a continuous product stream and a separate continuous reflux stream.

In distillation separation, the distillate or low boiling fraction which is obtained from adjacent the top of a distillation column is condensed and the liquid distillate is typically divided into a product stream and a reflux stream for return to the distillation column. The relative amounts of the product and reflux streams are usually determined by the quality of the distillate. Thus, it is often necessary to reflux a major amount of the distillate while drawing off only a small portion of the product to obtain the desired separation of the feed to the distillation column. Conversely, in some instances the desired separation is easy to attain and it is therefor possible to direct most of the condensed distillate to product while refluxing only a small portion of the condensed distillate stream. The distillation process is usually a continuous process run at attained steady state conditions.

In relatively small continuous distillation operations such as on a laboratory or pilot plant scale, the use of separate receivers, pumps and level controls for both the distillate product and reflux streams are not economical. Thus, a metering valve has been utilized to divide the condensed distillate into the separate product and reflux streams. A valve which has been conventionally used is a three-way valve which includes a single inlet port for the condensed distillate stream and two outlet ports, one for directing the distillate to a product stream and the other to the reflux stream. In such valves, however, the product stream and reflux stream are not directed simultaneously from the valve but alternate on a timed sequence in which the valve stays open only for product outlet for a limited period of time and then is opened only for reflux for a set period of time while the other outlet is closed. Accordingly, at one time there will be a stoppage of the flow of distillate either to the product stream or reflux stream. Such stoppage of flow may disrupt downstream operations at least with respect to further purification of product or, importantly, may disrupt the steady state concentrations achieved along the distillation column as reflux is stopped and then injected into the system.

In the processing scheme described above and in other processing schemes where a split flow is required, it may not be useful to split the flow such as with a T-connecting pipe inasmuch as it is often necessary or desirous that one of the split streams be precisely metered and have a substantially lower volume than the other. In such instance, the T-connector would not provide such uneven flow. Further, as seen from the above description, it is sometimes most useful and even necessary that the two split streams flow simultaneously from the valve to not disrupt downstream processing of the streams, thus, rendering the use of a conventional three-way valve as above-described disadvantageous. Accordingly, there is a need to improve the process of splitting a continuous fluid stream into a relatively large volume flow and a substantially smaller volume flow simultaneously.

Similar to the valve of the present invention which is described hereinafter, valves have been provided to remove from a primary fluid flow a secondary or lower volume flow. For example, U.S. Pat. No. 582,507, issued May 11, 1897, discloses a valve used to remove condensate from a steam line and which includes a passage therethrough for the main flow of gas and a valve stem which passes through the main flow and is seated upon a valve seat which contains a passage from the main flow and directed therefrom. When the valve stem is not seated, condensation in the main gas flow passes through the valve seat and away from the valve and main flow of gas.

U.S. Pat. No. 4,281,935, issued Aug. 4, 1981, discloses a similar valve containing an inlet and outlet for a primary fluid flow, a valve stem which passes through the primary flow and is seated on a valve seat which is located directly across the primary flow path relative to the valve stem and extends into the primary flow. The valve seat includes a passage communicating with the primary flow and with a separate inlet/outlet portion of the valve. The valve is disclosed as being primarily useful for injecting a fluid into the primary flow through the passage contained in the valve seat but, conversely, can be used to remove a small portion of the primary flow through the passage in the valve seat.

Neither of the above patents, however, are concerned with continuously metering a secondary flow from a continuous primary flow. Instead, the patents merely seem to be concerned with an on-off flow of the secondary stream to or from a primary flow stream.

Accordingly, an object of the present invention is to provide a process for splitting a continuous flow of fluid into two streams in which the split streams have substantially differing flow volumes without stoppage of flow.

Another object of the present invention is to provide a process for splitting a fluid flow using a metering valve which splits the flow of fluid into two continuous flowing streams of differing volumes.

Still yet another object of the invention is to provide a process for dividing a distillate stream into a product stream and a reflux stream while maintaining continuous flow of distillate, product and reflux.

A further object of the invention is to provide a novel metering valve for splitting a continuous flow of fluid into two continuous split streams of differing volumes without stoppage of flow.

SUMMARY OF THE INVENTION

To meet the objectives of the present invention, there is provided a metering valve which divides a continuous fluid stream passing therethrough into two streams, the first being a substantially unregulated fluid stream of similar volume to the fluid stream entering the valve and a second precisely metered fluid stream which has a substantially lower volume than the unregulated stream. The metering valve includes a primary fluid flow path through which the fluid flows unregulated from an inlet to an outlet and a valve seat containing a valve seat passage which communicates with the primary flow path and through which a small portion of the fluid flowing through the primary flow path is metered by a valve stem engaging and cooperating with the valve seat passage. Unlike a conventional three-way valve, the metering valve of the present invention allows both the unregulated flow through the primary flow path and the metered flow from the valve seat passage to flow simultaneously from the valve. Accordingly, there is no disruption of downstream processing of the two fluid streams. At the same time, the metering valve of the present invention provides a precisely controlled flow for one of the streams unlike a T-connector which provides for only unregulated flow.

The metering valve of the present invention has particular use in distillation systems as a flow splitter for streams which are drawn from the distillation process, a small portion of which must be recycled. An example is the condensed distillate stream which needs to be divided between a product stream and a reflux stream. Thus, condensed distillate passing through the primary flow path of the valve in an unregulated manner can be directed to reflux while the metered stream is directed to product or vice versa. The metering valve of this invention has uses other than in the environment of distillation columns and can be used in any system in which a small metered amount of fluid needs to be taken from a continuous fluid flow which does not require precise regulation, but where simultaneous flow out of the valve to maintain the continuity of the process is important.

DETAILED DESCRIPTION OF THE INVENTION

Figure 1:
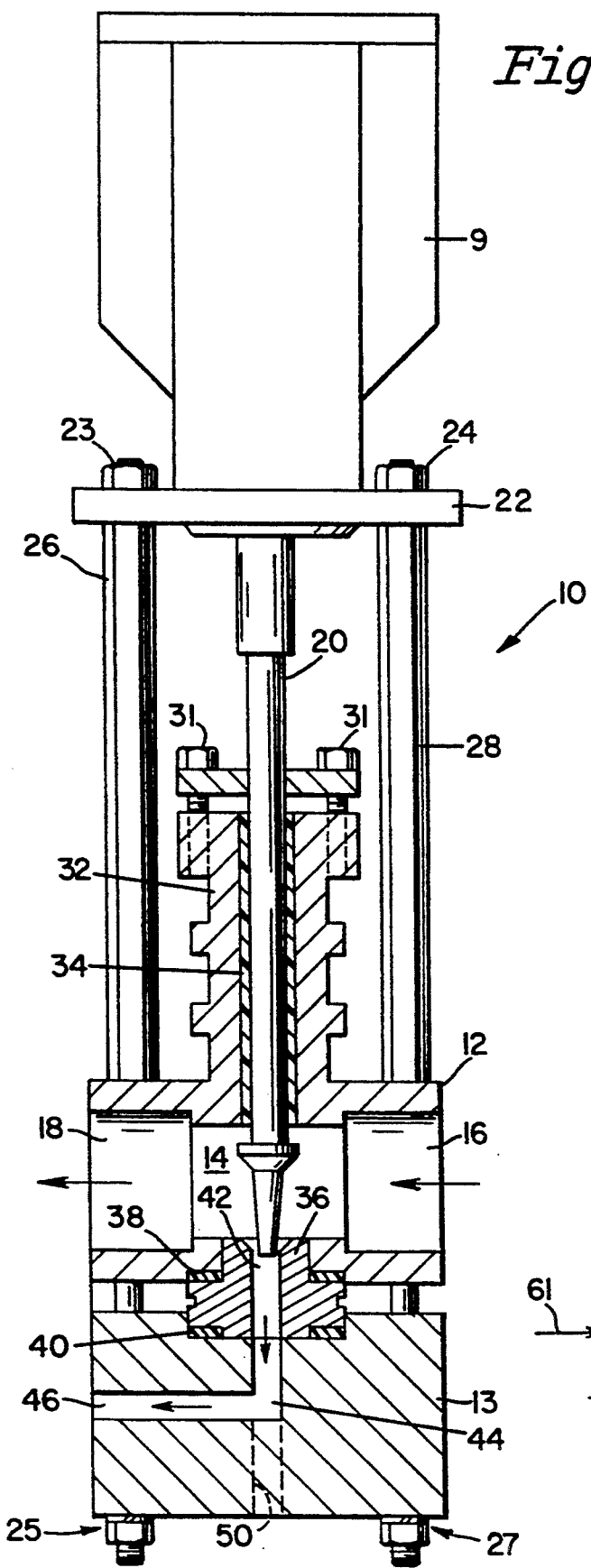
FIG. 1 is a cross-sectional view of the metering valve of the present invention.

FIG. 1 illustrates the metering valve of this invention capable of splitting a continuous flow of fluid into two simultaneous outlet streams of differing volume. Thus, metering valve 10 containing the embodiments of this invention includes an upper body 12 having a primary fluid flow path 14 therethrough from an inlet end 16 to an outlet end 18. Inlet 16 is connected to piping such as that carrying an unregulated continuous flow of fluid. Valve 10 includes a valve control mechanism comprising a valve stem 20 which may be actuated by any type of control mechanism such as a hand-operated wheel or an automatically controlled mechanism shown in schematic form and designated as reference numeral 9 and which is connected to the upper end of valve stem 20. Any known automatic actuating system whether pneumatic, electro-mechanical, etc. can be used. The specific valve stem actuating system is not critical to the invention. Valve stem 20 extends from the actuator 9 and is supported by a yoke 22 which is attached to valve 10 by bolts 23 and 24 threaded through upper valve body 12 and lower valve body 13. Bolts 23 and 24 are placed through guide spacer columns 26 and 28, respectively, extending from yoke 22 to upper valve body 12. Washer and nut assemblies 25 and 27 secure bolts 23 and 24, respectively. Valve stem 20 is further supported by a yoke 29 and extends through a passage in packing gland 32 lined with a friction-resistant material such as a teflon liner 34. Yoke 29 is attached to packing gland 32 by bolts 31. From the passage in packing gland 32, valve stem 20 passes through primary flow path 14 in upper valve body 12. Variations regarding the structure used to support valve stem 20 can be made without departing from the scope of this invention.

Metering valve 10 further includes a valve seat 36 located directly opposite valve stem 20 across primary flow path 14. The lower or metering portion of valve stem 20 passes through flow path 14 and then into cooperation and engagement with valve seat 36. Valve seat 36 is threaded or otherwise secured into upper valve body 12 against a gasket 38 to tightly seal valve seat 36 against upper valve body 12 and to prevent leakage. Gasket 40 also seals the valve seat 36 against lower valve body 13. Within valve seat 36, there is a metering passage 42 which communicates with the primary flow path 14. The position of valve stem 20 within metering passage 42 controls the volume of fluid diverted from primary flow path 14 and into the metered flow path. The metering portion of valve stem 20 comprises a gradual downstream narrowing taper such that as the valve stem is lifted while still in engagement with valve seat passage 42, a higher volume flow is provided and conversely lowering valve stem 20 lowers the volume flow rate through valve seat passage 42. Valve seat passage 42 also communicates with downstream outlet bore 44 formed within lower valve body 13 and outlet passage 46 placed at a right angle to valve seat passage 42. An alternative outlet passage can be formed in lower valve body 13. Thus, an outlet passage 50 can be drilled into the bottom of lower valve body 13 to communicate with bore 44 at a continuum of valve seat passage 42 instead of the 90° offset outlet passage 46.

The flow volume through valve seat passage 42 is substantially smaller, including orders of magnitude smaller, than flow through primary flow path 14 which provides for unregulated fluid flow through valve 10. Metering valve 10 thus diverts a relatively small portion of a fluid from a primary flow path through the valve to an additional flow path which is precisely regulated without stoppage of primary flow. Two continuous fluid streams are simultaneously formed from a single continuous feed stream.

Figure 2:
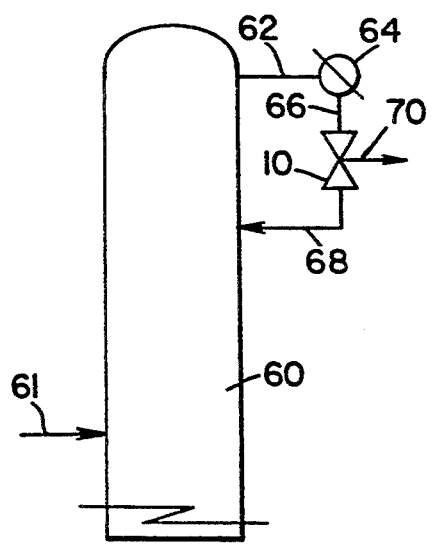
FIG. 2 is a schematic of a distillation process illustrating the placement of the metering valve to divide the distillate into product and reflux streams.

Metering valve 10 can best be understood with respect to its ability to operate as a flow splitter by referring to FIG. 2 which schematically illustrates a preferred use of the valve. FIG. 2 thus illustrates the flow splitter or metering valve 10 used to divide a condensed distillate stream into a product stream and a reflux stream for return to the distillation process. Distillation column 60 receives a feed stream 61 for separation and forms a low boiling distillate which is taken off near the top of column 60 as a distillate stream 62. Distillate stream 62 is directed to a condenser 64 which condenses the distillate to a liquid stream 66. It is desirous to take a portion of the distillate stream to product while refluxing the remaining portion of the condensed distillate to distillation column 60 for further separation. Referring to FIGS. 1 and 2, metering valve 10 is placed in-line with the condensed distillate stream 66. The distillate stream 66 will flow through the primary flow path 14 of valve 10. In the illustration shown in FIG. 2, the condensed distillate stream 68 leaving valve 10 from outlet 18 passes therethrough unregulated and constitutes the reflux stream directed back to distillation column 60. A portion of the condensed distillate is metered through valve seat passage 42. The metered condensed distillate stream is of substantially smaller volume than reflux stream 68 and leaves valve 10 via outlet 46 or 50 as a product stream 70. FIG. 2 represents only one configuration of a metering system for condensed distillate.

Thus, it may be desirable to take most of the condensed distillate stream to product, in which case, valve 10 would be oriented so as to provide for the condensed distillate stream which leaves primary flow path 14 via outlet 18 of valve 10 to be directed as an unregulated product stream while the relatively small volume metered stream would leave valve 10 as reflux.

The use of metering valve 10 as a flow splitter to divide a condensed distillate stream into product and reflux is only one example of use of the valve of this invention. Metering valve 10 may also be used to divide the residue from a distillation column into a waste stream and a recycle stream, for example. Uses of metering valve 10 other than for flow splitting in the environment of a distillation column are also within the scope of the present invention. In its broadest aspect, metering valve 10 is useful in any process which requires a small portion of a continuous fluid stream to be directed to a separate location or processing than the remaining fluid stream and, more particularly, when there is no particular need to precisely regulate the main flow of fluid. As above described, valve 10 is advantageous inasmuch as the primary flow and the metered flow stream leave the valve simultaneously avoiding any stoppage of one flow or the other which may disrupt downstream processing of either or both of the fluid streams.

Valve 10 of the present invention is useful as a flow splitter for any type of fluid whether liquid, vapor or as a slurry of solids in a liquid carrier.

What is claimed is:

1. A metering valve for dividing a continuous fluid stream into two split continuous fluid streams of differing volumes comprising: A valve body having an unregulated primary flow path therethrough from an inlet end to an outlet end, a valve stem, a valve seat located in said valve body and containing a passage therethrough communicating with said primary flow path and with a downstream outlet passage in said valve body separate from said primary flow path, said downstream outlet passage directing a portion of said continuous fluid stream to a location outside said valve body, said valve stem comprising a metering portion which seats within said valve seat passage so as to meter the amount of said continuous fluid stream being split from said continuous fluid stream passing through said primary flow path to said valve seat passage, said valve body including an upper valve body containing said primary flow path and a lower valve body containing said separate downstream outlet passage, said valve seat placed intermediate said upper valve body and said lower valve body.

2. The metering valve of claim 1 wherein said valve stem is movable through said primary flow path to engage said valve seat passage.

3. The metering valve of claim 2 wherein said valve stem is located intermediate said inlet and said outlet ends of said primary flow path.

4. The metering valve of claim 1 wherein said metering portion of said valve stem comprises a gradual downstream narrowing taper.

5. The metering valve of claim 1 including an actuator means connected to said valve stem capable of automatically moving said valve stem through said valve seat passage.

6. The metering valve of claim 1 wherein said downstream outlet passage from said valve body is at approximately a right angle to the flow direction of said valve seat passage.

7. The metering valve of claim 1 wherein said downstream outlet passage from said valve body forms a straight line passage with said valve seat passage.

* * * * *